United States Patent [19]

Murphy

[11]. Patent Number: 4,942,082
[45] Date of Patent: Jul. 17, 1990

[54] INCOMPATIBLE POLYMER ALLOYS AND LAMINATES THEREOF

[75] Inventor: Richard Murphy, North Andover, Mass.

[73] Assignee: Foss Manufacturing Co., Inc., Haverhill, Mass.

[21] Appl. No.: 722,361

[22] Filed: Apr. 12, 1985

[51] Int. Cl.$^5$ ............................................. B03D 3/00
[52] U.S. Cl. ................................... 428/224; 156/245; 156/308.6; 428/224; 428/286; 428/343; 428/346; 428/354; 428/355; 525/221
[58] Field of Search ............... 525/221; 428/343, 346, 428/354, 355, 283, 323, 324, 325, 240, 245, 284, 224; 156/245, 308.6

[56] References Cited

U.S. PATENT DOCUMENTS

| | | | |
|---|---|---|---|
| 3,869,422 | 3/1975 | Dawes et al. | 260/42.47 |
| 4,350,732 | 9/1982 | Goodwin | 428/246 |
| 4,473,683 | 9/1984 | Coran et al. | 525/221 |

FOREIGN PATENT DOCUMENTS

| | | |
|---|---|---|
| 261576 | 7/1963 | Australia . |
| 486254 | 5/1975 | Australia . |
| 549328 | 2/1982 | Australia . |
| 32096 | 2/1985 | Australia . |
| 0136059 | 4/1985 | European Pat. Off. . |
| 2144130 | 2/1985 | United Kingdom . |

*Primary Examiner*—James J. Bell
*Attorney, Agent, or Firm*—Jerry Cohen

[57] ABSTRACT

A stiff homogeneous alloy of incompatible ionic and nonionic thermoplastic resins comprising: at least about 65% by weight of an ionic copolymer crosslinked at least in part via ionic cross linking between carboxylic acid groups extending from separate copolymeric chains; and, less than about 35% by weight of a nonionic thermoplastic resin comprising a polymer of a monomer feed including an olefin having the general formula $RCH=CH_2$, wherein R comprises a phenyl radical. The phenyl radical may comprise a hydrocarbon or be substituted with non-ionic substitutents. Homogeneous films or sheets of the alloy are provided which may be used as such or as laminates as dimensional support stiffeners in clothing items.

7 Claims, No Drawings

INCOMPATIBLE POLYMER ALLOYS AND LAMINATES THEREOF

FIELD AND BACKGROUND OF THE INVENTION

The present invention relates to polymer alloys for use as dimensional support elements for shoes and specifically to an alloy of incompatible ionomeric and non-ionic polymers which is both stiff and moldable.

In footwear and other clothing item applications, the use of inherently stiff polymer films as stiffener support elements is desirable from the standpoint of durability and dimensional support but such stiff polymers are generally difficult to adhere to a shoe substrate and mold under reasonably low temperatures and pressures to the shape of the portion of the shoe, e.g. heel, toe, arch, (or other clothing item) into which the polymer stiffener is to be incorporated.

Alloys of polymers are possible in such applications but necessarily comprise alloys of compatible polymers having essentially the same chemical and physical characteristics. Although it is possible to alloy compatible polymers in bulk or sheet form to a degree sufficient to avoid layering and/or precipitation of the individual polymers in the alloy mixture, incompatible polymers, e.g., ionic and non-ionic, such as cross-linked ionomers and non-ionic polymers such as hydrocarbons—do not alloy well generally, and specifically will not alloy well enough to allow construction of a film or sheet suitable for use as a shoe or other clothing item stiffener. If layering occurs within a polymer alloy, any film constructed thereof loses homogeneity, fails to exhibit the properties of a true alloy, and rather exhibits awkward physical characteristics of its individual components as if fused in globular form.

It is, therefore, an object of the invention to provide a true alloy of incompatible polymers.

It is a further object of the invention to provide an alloy of incompatible polymers formable into a film for application as a stiffener in footwear or other clothing.

SUMMARY OF THE INVENTION

In accordance with the invention there is provided a stiff homogeneous alloy of incompatible ionic and non-ionic thermoplastic resins comprising: at least about 65% by weight of an ionic polymer crosslinked at least in part via ionic linking between carboxylic acid groups extending from separate copolymeric chains; and, less than about 35% by weight of a non-ionic thermoplastic resin comprising a polymer of a monomer feed including an olefin having the general formula $RCH=CH_2$, wherein R comprises a phenyl radical. The non-ionic thermoplastic resin typically comprises at least about 15% by weight of the final alloy product. The phenyl radical typically comprises a hydrocarbon but may also be substituted with non-ionic substituents which preferably include less than about six carbon atoms. The cross-linking of the ionic polymer is typically effected in major or exclusive part by ionic crosslinking of carboxylic acid functions.

With respect to applications concerning use of the alloy as a component providing dimensional support to an item of clothing there is provided a stiff laminate comprising an extruded film of the alloy and at least one layer of a solvent or heat activatable hot melt layer laminated to at least one side of the alloy film. There is also provided a stiff laminate comprising an extruded film of the alloy and at least one layer of fabric bonded to the alloy film at least in part through locking of fiber portions of the fabric layer into the alloy film. The fabric layer may be impregnated directly or indirectly with a thermoplastic stiffening material in liquid form hardenable within the fibers of the fabric to form a stiff solid fabric layer. One or more of the fabric layers preferably includes a hot melt layer laminated on the outside surface of the fabric layer.

The stiff alloy may also comprise a filler or stiffening material selected from the group consisting of fiberglass, talc, calcium carbonate, clay, mica and the like.

The stiff alloy of the invention is preferably made by mixing the ionic copolymer and the non-ionic thermoplastic resin in solid form to obtain a mixture of at least about 65% by weight of the ionic copolymer, transforming the solid mixture into a liquid by heating in an extruder, mixing the liquid into a homogeneous blend in the extruder, and extruding the blend to form the stiff alloy.

The stiff laminate of the invention is most preferably made by mixing the ionic polymer and the non-ionic polymer to obtain a first solid mixture comprising about 50% by weight of the ionic copolymer, transforming the solid mixture in an extruder into a liquid blend, extruding the blend to obtain a solid blend of the copolymer and the non-ionic polymer, diluting the solid blend with solid ionic copolymer to obtain a second solid mixture comprising at least about 30% by weight of the solid copolymer and less than about 70% of the solid blend, transforming the second mixture into a liquid by heating in the extruder, mixing the liquid in the extruder into a homogeneous blend of the ionic copolymer and the non-ionic polymer, and extruding the homogeneous mixture to form the stiff alloy.

The extruder accomplishes homogeneous mixing of the otherwise incompatible organic components by simultaneously liquifying the components along the length of an extended drive screw and intimately mixing the liquified components via manipulation of the screw. The screw is selectively heated at different areas along its length at varying temperatures according to a temperature profile predetermined as being most suitable for effective mixing of the incompatible polymers. The screw is further preferably turned at a rate predetermined as most effective for mixing and preferably includes a Maddock mixer. The screw may include means for liquid cooling and the extruder preferably includes a static mixer.

The invention also provides a process for making molded clothing products, typically shoes, comprising solvent or heat activating a hot melt layer which is included on one of the stiff laminate products of the invention and then molding it under heat and pressure in contact with a substrate, the hot melt layer of the final laminate contacting the substrate. With respect to those stiff laminate products of the invention which include an impregnated fabric layer without a hot melt layer coated thereon the invention further provides a process for making molded products comprising solvent or heat activating the impregnated fabric layer of the final laminate product and then molding it under heat and pressure in contact with a substrate, the impregnated fabric layer of the final laminate contacting the substrate.

DETAILED DESCRIPTION OF PREFERRED EMBODIMENTS

The alloy of the invention preferably comprises a combination of one or more ionic and one or more non-ionic polymers. Non-ionic polymers preferred for use are ionomers wherein individual polymer chains are cross-linked via ionic linking of carboxylic acid functions extending from the chain. Although such cross-linked ionomers are particularly incompatible with non-ionic polymers by virtue of their tendency to form micellular aggregations, controlled extrusion mixing will effect an opaque film product suitable for use as stiffener element.

A most preferred polymer is a thermoplastic resin derived from olefin monomer described in U.S. Pat. No. 3,427,733 of Feb. 18, 1969 to Beckwith describing a laminate of such resin with fabric, the disclosure of which is incorporated herein by reference. Such material may be more fully described as a copolymer of ethylene and methacrylic acids which have been partially reacted with metallic salts to form ionic crosslinks between the acid groups within a chain or between neighboring chains.

Metal ions most preferred in effecting the cross linking of such ionomers are sodium, zinc, potassium, magnesium, calcium. beryllium, strontium, cesium and barium. Although copolymers of ethylene and methacrylic acids are most preferred, ionic copolymers of monomer units having a copolymerizable ethylenic function (such as propylene, butylene, and the like) and monomer units including a basic copolymerizable propenoic acid function are suitable for use herein as an ionic polymer. Such ethylenic and propenoic acid constituents may be unsubstituted or substituted with non-ionic substitutents at either end of their olefinic termini.

A specific ionomer most preferred for use herein is an ionic copolymer selected from the class consisting of polymers of alpha-olefins having the general formula $RCH=CH_2$ where R is a radical selected from the class consisting of hydrogen and alkyl radicals having from 1 to 8 carbons atoms, the olefin content of the polymer being at least 50 mole per cent, based on the polymer and an alpha, beta-ethylenically unsaturated monocarboxylic acid, the acid monomer content of the polymer being from 0.2 to 25 mole percent, based on the polymer, the monomer-carboxylic acid polymer containing uniformly distributed through the polymer a metal ion having a valence of 1 to 3 inclusive, and polymers of said olefin content and an alpha, beta-ethylenically unsaturated dicarboxylic acid, the acid content of the polymer being from 0.2 to 25 mol percent based on the polymer, the dicarboxylic acid copolymer containing uniformly distributed throughout the polymer a monovalent metal ion, in which at least 10 percent of the carboxylic acid groups of the monovalent and divalent carboxylic acid polymer are neutralized by the metal ions. Such ionomers are available from E. I. DuPont de Nemours as marketed under the tradename Surlyn.

Preferred non-ionic polymers for inclusion in the alloy of the invention which are inherently incompatible with the ionic polymers are hydrocarbons and most preferably those derived from a monomer feed including an olefin having the general formula $RCH=CH_2$ wherein R comprises a phenyl radical. Other less suitable non-ionic polymers include polyethylene, polypropylene, ethylene-vinyl-acetate, ethylene-ethyl-acrylate, acrylonitrile-butadiene-styrene, polyvinyl chloride and various formulated blends of the above. Polystyrene and non-ionic substituted variants thereof are most preferred for alloying.

The basic incompatibility of the non-ionic and ionic components of the alloy of the invention is overcome by special mixing whereby the non-ionic and ionic components are initially bulk mixed in solid pelletized form, the non-ionic polymer comprising less than about 35% by weight (typically not less than about 15%) and the ionic polymer comprising at least about 65% by weight of the mixture. The resultant solid mixture is transformed into a liquid and mixed by heating and feeding in and through an extruder. Most preferably the non-ionic and ionic polymers are first mixed in a more concentrated form, typically on a 50/50 by weight basis, and mixed and extruded with heating to produce a first pass solid blend. Such first pass solid 50/50 blend is next diluted with pure solid non-ionic polymer, to obtain a second solid mixture, the blend typically comprising less than about 70% of the second mixture and the non-ionic polymer typically comprising at least about 30% by weight of the second mixture. The second mixture is finally extruded with heating and mixing to obtain a final homogeneous alloy. The extruder preferably includes a static mixer and a screw including a Maddock mixer.

The stiff laminates of the invention are constructed by extruding the alloy into a sheet or film and preferably laminating a layer of fabric to the alloy film as it is extruded. The fabric may be adhered by conventional methods to the alloy sheet. The fabric typically comprises a woven or non-woven fabric, e.g. cotton, rayon, nylon, polyester, polypropylene, or blends thereof, impregnated by liquid saturation with a thermoplastic stiffening and/or adhesive material. The impregnant typically comprises polystyrene which may include copolymerized components therewith, butadienes, acrylonitriles, acrylates copolymers thereof and similar stiffening materials. Saturation of the fabric layer may be effected prior to lamination of the fabric layer on the alloy film or after the fabric has been laminated on the film. Partial interlocking of the fibers of the fabric within the alloy film is accomplished in a manner analogous to that described in U.S. Pat. No. 4,350,732 of Mar. 25, 1981, to Goodwin.

A stiff laminate according to the invention may include a layer of hot melt adhesive compound for purposes of most readily adhering the laminate to a substrate for secure dimensional support. Preferred hot melts comprise ethylene vinyl acetate, tackifying resin, waxes and the like, which are activatable under appropriate heat and pressure conditions, typically the same conditions as are used in molding the laminate to the particular shape of the substrate to which the laminate is to be adhered. The hot melt layers used herein may be applied directly to a film surface of the alloy or may be applied to the outside surface of a fabric layer already laminated or otherwise adhered to a film alloy. In those instances where a hot melt layer is applied to the surface of a fabric layer, the thermoplastic impregnant, with which a fabric layer is typically saturated, may play a part in adhesion of the laminate to a substrate in conjunction with the hot melt. Preferably, however, the hot melt, whether applied directly to the surface of a film alloy or to the surface of an impregnated fabric layer, plays the sole or primary role in adhering the laminate to the substrate.

Molding of a final laminate product including an alloy film having a film thickness ranging from about 0.010 inches to about 0.060 inches is effected under the application of heat and pressure to the laminate which is kept in contact with the substrate. The degree of heat and pressure necessary to mold and adhere such alloy containing laminates to a substrate is substantially less than that which is necessary to mold and adhere pure ionomer films of similar thickness. The hot melt layers coated on the film alloy itself or on a fabric layer are also activatable under such reduced molding conditions.

With respect to the impregnant with which the fabric layers of a laminate product may be saturated, such impregnants and particularly polystyrene based impregnants mold well under heat and pressure conditions suitable for molding of the alloy films, and such molding of the impregnant is especially aided by dipping the laminate product in aromatic solvents which itself causes substantial softening of the impregnant.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A stiff laminate comprising an extruded film of a homogeneous alloy of incompatible ionic and non-ionic thermoplastic resins comprising:

At least about 65% weight of an ionic polymer cross-linked at least in part via ionic linking between carboxylic acid groups extending from separate polymeric claims; and, less than about 35% by weight of a non-ionic thermoplastic resin comprising a polymer of a monomer feed including an olefin having the general formula $RCH=CH_2$, wherein R comprises a phenyl radical and at least one layer of a solvent or heat activatable thick solid adhesive layer laminated to at least one side of the alloy film.

2. A stiff laminate comprising an extruded film of a homogeneous alloy of incompatible ionic and non-ionic thermoplastic resins comprising:

at least about 65% weight of an ionic polymer cross-linked at least in part via ionic linking between carboxylic acid groups extending from separate polymeric chains; and, less than about 35% by weight of non-ionic thermoplastic resin comprising a polymer of a monomer feed including an olefin having the general formula $RCH—CH_2$, wherein R comprises a phenyl radical and at least one layer of fabric bonded to the alloy film at least in part through locking of fabric fiber portions of the fabric layer into the alloy film.

3. The product of claim 2 wherein the fabric layer is impregnated with a thermoplastic stiffening material to form a stiff solid fabric layer.

4. The product of claim 3 wherein one or more of the fabric layers includes a thick, solid activatable adhesive layer laminated on the outside surface of the fabric layer.

5. A process for making molded products comprising solvent or heat activating a thick, solid adhesive layer of the claim 1 final laminate product and then molding it under heat and pressure in contact with a substrate, the hot melt layer of the final laminate contacting the substrate.

6. A process for making molded products comprising solvent or heat activating the impregnated fabric layer of the claim 3 final laminate product and then molding it under heat and pressure in contact with a substrate, the impregnated fabric layer of the final laminate contacting the substrate.

7. A process for making molded products comprising solvent or heat activating the thick, solid adhesive layer of the claim 4 product and then molding it under heat and pressure in contact with a substrate, the thick, solid adhesive layer of the final laminate contacting the substrate.

* * * * *